US010540200B2

(12) United States Patent
Cheng et al.

(10) Patent No.: US 10,540,200 B2
(45) Date of Patent: Jan. 21, 2020

(54) HIGH PERFORMANCE CONTEXT SWITCHING FOR VIRTUALIZED FPGA ACCELERATORS

(71) Applicant: Advanced Micro Devices, Inc., Sunnyvale, CA (US)

(72) Inventors: Kevin Y. Cheng, Austin, TX (US); David A. Roberts, Boxborough, MA (US); William C. Brantley, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 57 days.

(21) Appl. No.: 15/809,940

(22) Filed: Nov. 10, 2017

(65) Prior Publication Data
US 2019/0146829 A1 May 16, 2019

(51) Int. Cl.
*G06F 9/46* (2006.01)
*G06F 9/50* (2006.01)
*G06F 13/40* (2006.01)
*G06F 13/42* (2006.01)

(52) U.S. Cl.
CPC .......... *G06F 9/461* (2013.01); *G06F 9/5016* (2013.01); *G06F 13/4022* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| 5,737,631 A | 4/1998 | Trimberger |
| 6,091,263 A | 7/2000 | New et al. |
| 6,237,054 B1 | 5/2001 | Freitag |

(Continued)

FOREIGN PATENT DOCUMENTS

WO    2017117122 A1    7/2017

OTHER PUBLICATIONS

Brown, Stephen, and Jonathan Rose "Architecture of FPGAs and CPLDs: A tutorial." IEEE Design and Test of Computers 13.2 (1996): 42-57.

(Continued)

*Primary Examiner* — Wynuel S Aquino
(74) *Attorney, Agent, or Firm* — Liang & Cheng, PC (57) ABSTRACT

A hardware context manager in a field-programmable gate array (FPGA) device includes configuration logic configured to program one or more programming regions in the FPGA device based on configuration data for implementing a target configuration of the one or more programming regions. Context management logic in the hardware context manager is coupled with the configuration logic and saves a first context corresponding to the target configuration by retrieving first state information from the set of one or more programming regions, where the first state information is generated based on the target configuration, and storing the retrieved first state information in a context memory. The context management logic restores the first context by transferring the first state information from the context memory to the one or more programming regions, and causing the configuration logic to program the one or more programming regions based on the configuration data.

20 Claims, 4 Drawing Sheets

(56) References Cited

U.S. PATENT DOCUMENTS

| | | | |
|---|---|---|---|
| 7,180,324 | B2 | 2/2007 | Chan et al. |
| 7,243,221 | B1 | 7/2007 | Ryser |
| 7,410,884 | B2 | 8/2008 | Ramanathan et al. |
| 7,902,865 | B1 | 3/2011 | Cheng et al. |
| 8,458,720 | B2 | 6/2013 | Bansal et al. |
| 8,928,351 | B1 | 1/2015 | Konduru |
| 10,164,639 | B1 | 12/2018 | Roberts et al. |
| 2007/0101108 | A1* | 5/2007 | Grossman ............... G06F 9/461 712/228 |
| 2010/0066408 | A1 | 3/2010 | Kyouno et al. |
| 2012/0253762 | A1* | 10/2012 | Ergas ..................... G01V 11/00 703/6 |
| 2012/0266018 | A1* | 10/2012 | Tanaka ................ G06F 11/2097 714/19 |
| 2013/0318240 | A1 | 11/2013 | Hebert et al. |
| 2015/0113538 | A1 | 4/2015 | Giroux et al. |
| 2015/0155876 | A1 | 6/2015 | Jayasena et al. |
| 2016/0212065 | A1 | 7/2016 | To et al. |
| 2016/0314025 | A1 | 10/2016 | McGarry et al. |
| 2016/0380635 | A1 | 12/2016 | Roberts |
| 2017/0061055 | A1* | 3/2017 | Khan ................ G06F 17/5054 |
| 2018/0032657 | A1* | 2/2018 | Matsumura ......... G06F 15/7867 |

OTHER PUBLICATIONS

Campi F et al: "A VLIW processor with reconfigurable instruction set for embedded applications", IEEE Journal of Solid-State Circuits, IEEE Service Center, Piscataway, NJ, USA, vol. 38, No. 11, Nov. 1, 2003 (Nov. 1, 2003), pp. 1876-1886, XP011102775, ISSN: 0018-9200, 001: 10. 1109/JSSC.2003.818292 figures 2-5 figure 8 page 1878, right-hand column, line 7-line 20 page 1880, left-hand column, line 25-line 37.

International Search Report, Application No. PCT/US2016/032504 dated Sep. 1, 2016.

Rose, Jonathan, Abbas El Gamal, and Alberto Sangiovanni-Vincentelli. "Architecture of field-programmable gate arrays." Proceedings of the IEEE 81.7 (1993): 1013-1029.

Tapp, Stephanie. "Bpi fast configuration and impact flash programming with 7 series fpgas." (Feb. 9, 2015). Xilinx, Inc.

Georgsen, Sindre, Hardware Context Switching on FPGAs, Jan. 1, 2014 (Jan. 1, 2014), XP055545223, Retrieved from the Internet: URL:https://pdfs.semanticscholar.org/4a4a/f3d8f3fb98c181dc2339375ef0342fcd24e1.pdf; Section 2.5.2.1; pp. 5-14.

International Search Report and Written Opinion of the International Searching Authority, Application No. PCT/US2018/042172 dated Oct. 23, 2018.

International Search Report and Written Opinion of the International Searching Authority, Application No. PCT/US2018/051373 dated Jan. 31, 2019.

Marescaux, T., Nollet, V., Mignolet, J. Y., Bartic, A., Moffat, W., Avasare, P., . . . & Lauwereins, R. (2004). Run-time support for heterogeneous multitasking on reconfigurable SoCs. Integration, the VLSI journal, 38(1), 107-130.

Rana, V., Santambrogio, M., Sciuto, D., Kettelhoit, B., Koester, M., Porrmann, M., & Ruckert, U. (Mar. 2007). Partial dynamic reconfiguration in a multi-fpga clustered architecture based on linux. In 2007 IEEE International Parallel and Distributed Processing Symposium (p. 173). IEEE.

Santambrogio, M. D., Cancare, F., Cattaneo, R., Bhandariy, S., & Sciuto, D. (May 2012). An Enhanced Relocation Manager to Speedup Core Allocation in FPGA-based Reconfigurable Systems. In Parallel and Distributed Processing Symposium Workshops & PhD Forum (IPDPSW), 2012 IEEE 26th International (pp. 336-343). IEEE.

* cited by examiner

HIGH PERFORMANCE CONTEXT SWITCHING FOR VIRTUALIZED FPGA ACCELERATORS

GOVERNMENT RIGHTS

This invention was made with Government support under Prime Contract Number DE-AC52-07NA27344, Subcontract Number B620717 awarded by DOE. The Government has certain rights in this invention.

BACKGROUND

A field-programmable gate array (FPGA) is an integrated circuit device that is designed to be configured by an end user after manufacturing. In general, an FPGA includes an array of uncommitted circuit elements, called logic blocks, that are connected together by interconnect resources making up a programmable interconnect fabric. The interconnect resources may include, for example, logic gates that can be inter-wired in different configurations. The logic blocks in the FPGA can be configured to perform complex combinational functions, or logic functions such as AND or XOR. Logic blocks in an FPGA can also include memory elements, which may be implemented as simple flip-flops or more complete blocks of memory.

In an FPGA, the logic blocks can include elements such as lookup tables (LUTs) and other fixed functions that are programmed by inserting values into small Static Random Access Memories (SRAMs) or registers. The programming must be performed before the logic blocks can be used. After programming, each combination of function inputs to an LUT results in a predefined output, allowing implementation of any logic function. A typical FPGA relies on an external memory device and a single, relatively slow serial programming port for configuration. The FPGA typically has a "configuration mode" and a separate "user mode" where the entire chip is either in an idle state waiting to be programmed, or the programmed chip is running.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Modern datacenters often provide computing clusters that include field programmable gate array (FPGA) devices that can be programmed to handle customers' workloads. Customer workloads can be provided to the FPGA devices via a host device, along with configuration data for defining how the FPGA devices are to be configured for executing tasks in the workload. The FPGAs can be configured as hardware accelerators to efficiently process specialized tasks. However, FPGAs can be slow to program, and current solutions also lack support for multi-threaded workloads for multiple virtual machines sharing resources of a single FPGA. In one embodiment, these computing schemes can be supported by an FPGA device that has context-switching capabilities. Support for context switching enables time multiplexing on FPGA devices to allow several host devices to share resources of a single FPGA, or to use multiple swappable fixed acceleration designs in the FPGA. This allows virtualization of the FPGA resources, so they can be more efficiently used in, for example, large-scale cluster, datacenter, and high performance computing (HPC) applications.

One embodiment of an FPGA device that supports context switching includes a hardware context manager that assists the host system with high-performance bitstream (i.e., configuration) switching and context switching. In one embodiment, the FPGA facilitates the saving and restoring of register and memory states of programming regions in the FPGA using a scan chain configuration. The state information can then be stored in context memory in different locations in order to optimize for high performance (e.g., on-FPGA block random access memory (BRAM)) or high density (dynamic random access memory (DRAM) or off-board memory).

Figure 1:
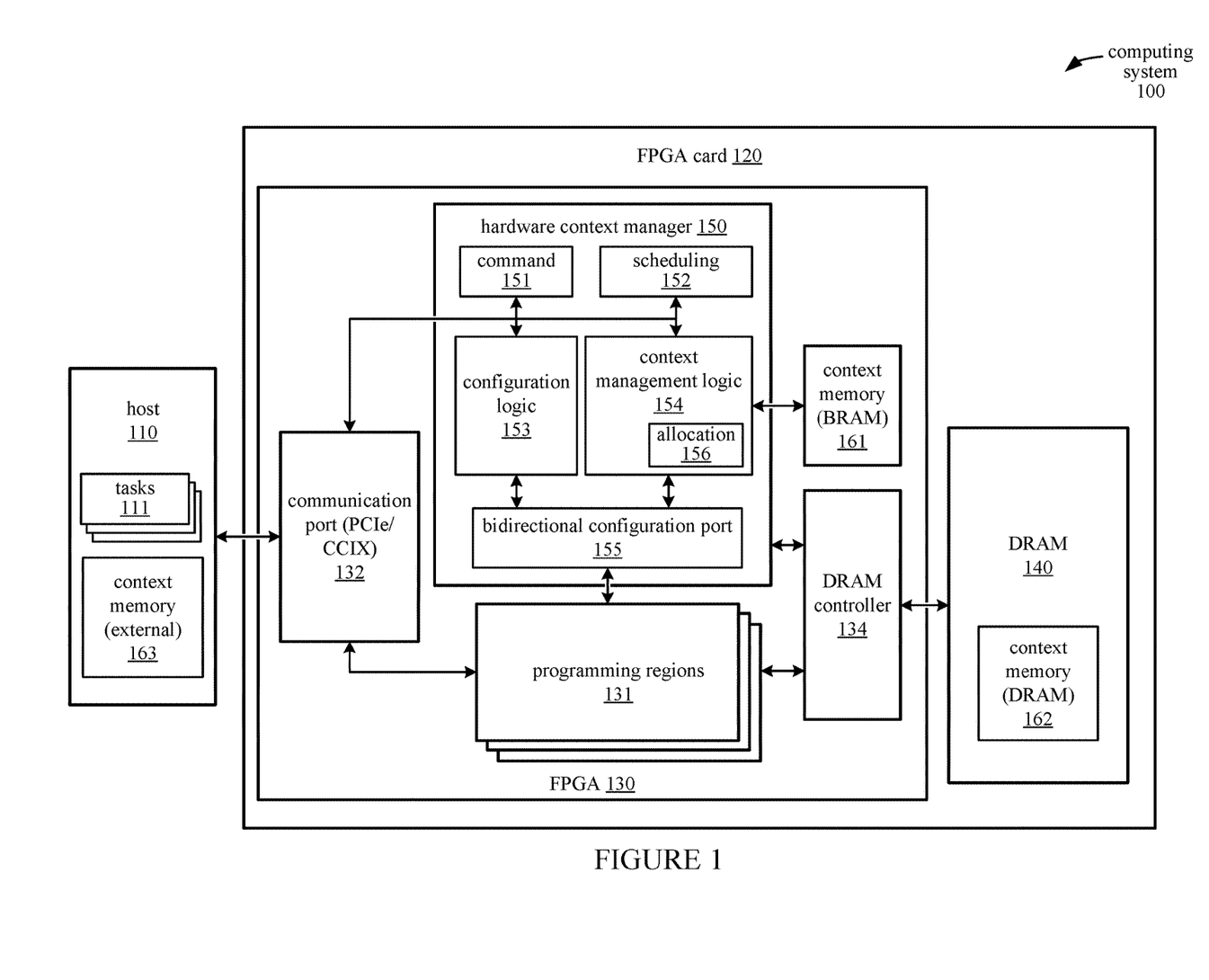
FIG. 1 illustrates an embodiment of a computing system that supports context switching in a field programmable gate array (FPGA).

FIG. 1 illustrates an embodiment of a computing system 100 that includes an FPGA device that supports context switching. Computing system 100 includes a host device 110 that is connected to an FPGA card 120, and that can utilize resources on FPGA card 120 for processing tasks 111 in a workload.

In one embodiment, the FPGA card 120 is a physical circuit board on which the electronic components, such as the FPGA 130 and the DRAM 140 are mounted. In one embodiment, the FPGA card 120 supports multiple FPGAs, including the FPGA 130. Further, the FPGA card 120 may be one of multiple similar FPGA cards contained in a server chassis within a datacenter.

The resources of the multiple FPGAs, including FPGA 130, are available for use by host device 110. The host device 110 may be contained within the same chassis, or in alternative embodiments may be remote and may communicate with the FPGA card 120 over a network. The host device 110 provides tasks 111 and configuration data (e.g., configuration bitstream, etc.) for configuring the FPGA for accelerating the tasks 111.

The host device 110 communicates with the FPGA 130 on the FPGA card 120 via a communication port 132 of the FPGA 130. In one embodiment, the communication port 132 is a Peripheral Component Interconnect Express (PCIe) physical port that operates according to the Cache Coherent Interconnect for Accelerators (CCIX) standard. Within the FPGA 130, the communication port 132 is connected to the hardware context manager 150 and the programming regions 131, and facilitates communication between the host device 110 and these components of the FPGA 130.

The programmable logic in the FPGA 130 is subdivided into separate programming regions 131 that can be independently programmed and operated. Accordingly, the host device 110 is able to specify a target configuration and request execution of a task in the target configuration for each of these programming regions 131 independently. Execution of a task in one or more of the configured programming regions 131 generates state information, which includes values that are modified during execution of instructions in the configured programming regions 131. Saving the context for the task (e.g., in connection with a reconfiguration of the programming regions 131) entails saving the state information so it can be restored back to the one or more programming regions 131 at a later time. For example, a first thread being executed in one or more of the programming regions 131 can be paused so that a second thread can reconfigure the programming regions 131, then the prior configuration and context can be restored from a context memory in order to resume the first thread after the second thread is finished executing in the one or more programming regions. In one embodiment, the saved context also includes configuration data such as the bitstream used to configure the programming regions 131 so that the configuration corresponding to the state information can also be restored.

In the FPGA 130, the hardware context manager 150 facilitates reconfiguration (i.e., bitstream switching) and context switching for the programming regions 131. In the computing system 100, the circuit modules of the hardware context manager 150 (e.g., command interface 151, scheduling logic 152, configuration logic 153, and context management logic 154) are located on the same die as the programming regions 131 of the FPGA 130. In one embodiment, the hardware context manager 150 is implemented using dedicated logic circuitry located on the same die as the programming regions 131. In alternative embodiments, the circuit modules of the hardware context manager 150 are implemented by programming one or more configurable logic blocks of programming regions similar to programming regions 131 in the FPGA 130, or the hardware context manager 150 may be partially implemented in dedicated logic and partially implemented in configurable logic. In alternative embodiments, the hardware context manager 150 may be in a device separate from the FPGA 130, and not located on the FPGA die.

The hardware context manager 150 performs a number of functions in the FPGA 130, including bitstream switching, context saving and restoring, and scheduling of tasks requested by the host device 110. In addition, the hardware context manager 150 is addressable by the host 110 so that the host device 110 can issue commands to schedule threads and to initiate context switching and bitstream swapping. In connection with the saving of contexts, the hardware context manager 150 also determines how and where to store the state information and configuration data that make up each context.

In the hardware context manager 150, the configuration logic 153 performs the programming of the programming regions 131 based on configuration data for implementing a target configuration in one or more of the programming regions 131. In one embodiment, the configuration logic 153 programs the one or more programming regions 131 by loading the configuration data into configuration memory, where the contents of the configuration memory determine which functions are implemented in the configurable logic blocks of the programming regions 131, and how the blocks are connected.

The context management logic 154 performs the functions of saving and storing contexts. For example, a task executing in a particular configuration of programming regions 131 generates data that is stored in registers and other memory in the programming regions 131. The context management logic 154 saves a context for this task by retrieving the state information, which includes the contents of the registers and other memory in the programming regions 131, and storing the retrieved state information in context memory 161-163. The context management logic 154 can later restore the context by transferring the state information from the context memory 161-163 back to the programming regions 131.

In one embodiment, the context management logic 154 also monitors the progress of tasks being executed in the programming regions 131 so that the task processing can be allowed to complete to a checkpoint before a context switch is effected. This checkpointing approach could be employed to reduce the amount of state information that needs to be stored for a context. For example, a checkpoint may be indicated when all dependencies on internal register states have been cleared. Accordingly, the internal register states need not be recorded in the saved context, and a smaller portion of the context memory can be used to save the context.

The context management logic 154 is also connected to a bidirectional configuration port 155 that is used by the context management logic 154 to transmit state information to the programming regions 131 when restoring a context. The context management logic 154 also uses the bidirectional configuration port to receive the state information from the programming regions 131 when saving a context. Thus, the communication of state information can logically take place in both directions across the bidirectional configuration port 155. In one embodiment, separate read and write ports are used in place of the bidirectional configuration port 155. Since the memory state of the blocks in the programming regions 131 can be streamed out of the bidirectional configuration port 155, the context management logic 154 can monitor the progress of tasks being executed in the programming regions 131 for the purposes of determining whether a checkpoint has been reached.

Aside from saving and restoring contexts, the bidirectional configuration port 155 is also used by the configuration logic 153 to program a specified region (i.e., one or more of the programming regions 131) to implement a circuit or hardware accelerator. Reprogramming of the region also occurs when a context is restored to the region, before execution of the task using the restored context can resume. Accordingly, when a context is restored, the context management logic 154 in one embodiment signals the configuration logic 153 to program the one or more programming regions 131 based on configuration data corresponding to the context being restored. In addition, the context management logic 154 notifies the host when the region has had its context restored and is ready to receive additional commands or data. Similarly, the context management logic 154 also notifies the host when a context save for the region is been completed.

When saving a context, the context management logic 154 stores the state information for the context in context memory. The computing system 100 includes context memory 161 in block random access memory (BRAM) in the FPGA device 130, context memory 162 in dynamic random access memory (DRAM) located on the carrier card 120 of the FPGA device 130, and context memory 163 in the host device 110 that is external to the FPGA carrier card 120. A context can be stored across any combination or subset of the context memories 161, 162, and 163.

The context memory 161 includes a portion of BRAM of the FPGA 130. The BRAM includes memory that is located within the blocks of one or more programmable regions of the FPGA 130, similar to the programmable regions 131. In one embodiment, the context memory 161 is implemented using BRAM in the same programming region that is used to implement the hardware context manager 150. Alternatively, the context memory 161 may be implemented in BRAM in the programming regions 131 or in other programming regions in the FPGA 130.

Context data to be stored in the context memory 161 need not pass through the DRAM controller 134 and remains on the same FPGA die 130 as the programming regions 131 from which it is retrieved. Accordingly, using the on-board BRAM of the FPGA 130 as context memory 161 offers the lowest latency for storing contexts, with writes accomplished with as little as 1 cycle of latency. However, the amount of BRAM available on the FPGA 130 may be limited, and using BRAM for context memory 161 reduces the amount of on-chip memory available for executing tasks in the programming regions 131.

FPGA carrier cards can include some DRAM, non-volatile memory (NVM) or other type of memory that is local to the FPGA card from which context memory can be allocated. In FPGA card 120, the context memory 162 is allocated from DRAM 140, which can be accessed by the FPGA 130 via its DRAM controller 134. In one embodiment, the DRAM 140 may be 3D-stacked on top of the FPGA die, or may be located on an interposer between the FPGA and the FPGA card 120.

Another location for storing contexts is in the external context memory 163, which is located off the FPGA card 120. In computing system 100, the context memory 163 is stored in the memory of host device 110. Relative to context memory 161 in BRAM and context memory 162 in DRAM, the external context memory 163 has the highest latency since the context data is transmitted a longer distance to the host 110 via the communication port 132, but may also have the highest capacity. Also, while contexts can be stored in BRAM or DRAM on the FPGA card 120 without utilizing host resources for managing the contexts, the contexts stored in context memory 163 on the host device 110 are managed by the host itself. Although this may consume more host resources, the host 110 can store and manage a larger number of contexts, or perform other processing on the saved contexts.

In view of the different drawbacks and advantages of the above types of context memory 161-163, the context management logic 154 includes allocation logic 156 for optimally allocating context memory for particular contexts by trading off memory capacity and context switching speed (due to memory latency). The allocation logic 156 thus allows flexible use of all the context memory locations 161-163, based on an expected access frequency of the context being placed.

For example, the allocation logic places more frequently used contexts (including state information and configuration data) in lower latency context memory, such as BRAM, while placing larger and/or less frequently used contexts in higher latency and higher capacity context memory, such as external context memory 163. In the computing system 100, BRAM has the lowest latency, followed by DRAM 140 and external memory in the host 110 with the highest latency. The external memory in the host 110 has the highest capacity, while the DRAM 140 has a lower capacity and the BRAM has the lowest capacity. In one embodiment, the context is replicated in two or more of the context memories 161, 162, and 163 to tolerate faults occurring in one of the context memories.

In a FPGA accelerator, the pathway of registers and BRAMs in the programming regions are defined in the synthesis stage. During synthesis, a report indicating the total amount of BRAM used in the design is generated. The information in this synthesis report can be leveraged by the context management logic 154 to reserve an appropriate amount of context memory for the design. In one embodiment, the allocation logic 156 allocates enough space in the context memory 162 for the design based on adding the size of the configuration bitstream and the size of the BRAM as determined during the synthesis process.

The hardware context manager 150 includes a command interface 151 that responds to commands from the host device 110 and enables the host 110 to invoke the functions of the hardware context manager 150. The host device 110 is thus able to issue commands to the hardware context manager 150 to cause the context management logic 154 to save or restore a context, or to schedule a task to be executed in one or more of the programming regions 131 using a particular configuration. Commands received by the command interface 151 can provide a unique context identifier to indicate a local or remote process that is requesting service. The context management logic 154 associates the requesting process with its corresponding context (including the state information and configuration data) using the context identifier. In addition to commands for programming the programming regions 131 and for processing data, the command interface also responds to the following commands, which are addressable to specific regions of the programming regions 131.

The command interface 151 responds to a 'Start Task (Context ID)' command by starting processing of input data (e.g., the configuration bitstream, synthesis report, etc.) and associating the supplied 'Context ID' value with the register and memory state in the design. The host device 110 sends the 'Start Task (Context ID)' command to prepare a task for execution in the programming regions 131 using a target configuration specified by the host 110.

The command interface 151 responds to a 'Save Context (Context ID)' command by stopping the FPGA clock and causing the context management logic 154 to read state information from the one or more programming regions associated with the specified 'Context ID'. The state information includes register and memory state that is associated with the context identifier 'Context ID' and is thus indicated as being part of the specified context. The state information is stored in one or more of the context memory locations 161-162. A configuration bitstream associated with the context identifier may also be saved as part of the context.

The command interface 151 responds to a 'Restore Context (Context ID)' command by stopping the FPGA clock and causing the context management logic 154 to restore the context identified by 'Context ID' from the context memory to the programming regions 131. Restoring the context includes copying the state information back to the original registers and memory in the programming regions 131 and reprogramming the programming regions 131 (e.g., swapping bitstreams) based on configuration data in the context.

The command interface 151 responds to a 'Read Context (Context ID)' by causing the context management logic 154 to read a saved context identified by 'Context ID' from an internal context memory 161-162 and transfer the context via communication port 132 to be stored in the external context memory 163 on host 110. Alternatively, the 'Read Context' command may be used to read a context from on-board context memory 161-162 to another off-board external memory device. This capability facilitates external context management by an attached or remote host system 110. The command interface 151 responds to a 'Write Context (Context ID)' by causing the context management logic 154 to write a saved context identified by 'Context ID' to the reconfigurable region.

The command interface 151 responds to a 'Start Transaction (Transaction ID)' command by causing the hardware context manager 150 to start execution of a current transaction that is ready for executing in the programming regions 131. In one embodiment, a transaction is a portion of a task that is terminated by a checkpoint. The specified 'Transaction ID' is assigned to the current transaction. Any context commands (e.g., 'Save Context', 'Restore Context', 'Read Context', 'Write Context') received between the 'Start Transaction' command and an 'End Transaction' indication are queued until 'End Transaction' is received.

The 'End Transaction (Transaction ID)' indication is issued by the hardware context manager 150 to notify the host 110 that execution of a transaction has ended. At the end of the transaction, as indicated by 'End Transaction', any queued context commands can be processed. In one embodiment, 'Start Transaction' commands and 'End Transaction' indicators are embedded in the input and output data for the task, respectively, or in a hardware managed task queue in order to be part of the data processing flow, rather than being handled as externally managed transaction messages. This approach can decrease latency for the 'Start Transaction' and 'End Transaction' messages.

While the above functions can generally by performed by the hardware context manager 150 without explicit input from the host device 110, the command interface 151 allows the host device 110 or another external device to manage the saving and restoring of contexts in the FPGA 130. Requests to manipulate tasks or contexts in the FPGA 130 are protected by a security mechanism. Security may be achieved by using encrypted messages, authentication keys, or other methods.

The hardware context manager 150 includes scheduling logic 152 for controlling the timing of actions performed by the hardware context manager 150, such as saving and restoring contexts, configuring the programming regions 131, and starting and stopping task execution. In one embodiment, the scheduling logic 152 tracks the progress of tasks being executed in the programming regions 131 and initiates context operations and transaction operations based on the execution progress and on other factors, such as a sequence of tasks pending execution in the programming regions 131 and commands received via command interface 151.

For example, given a sequence of tasks 111 to be executed in the programming regions 131, the scheduling logic 152 determines the sequence in which the tasks will be executed, and schedules context switches as appropriate for switching between the tasks. The scheduling process can also determine in which programming regions 131 each of the different tasks will be executed. The scheduling may be determined based on task priority or to optimize by, for example, minimizing the amount of context switching, maximizing the number of programming regions 131 used, etc. The scheduling logic 152 then causes the context management logic 154 to save and restore contexts according to the schedule. In one embodiment, the scheduling logic 152 determines whether the task execution has reached a checkpoint before causing the context management logic 154 to save or restore a context.

Figure 2:
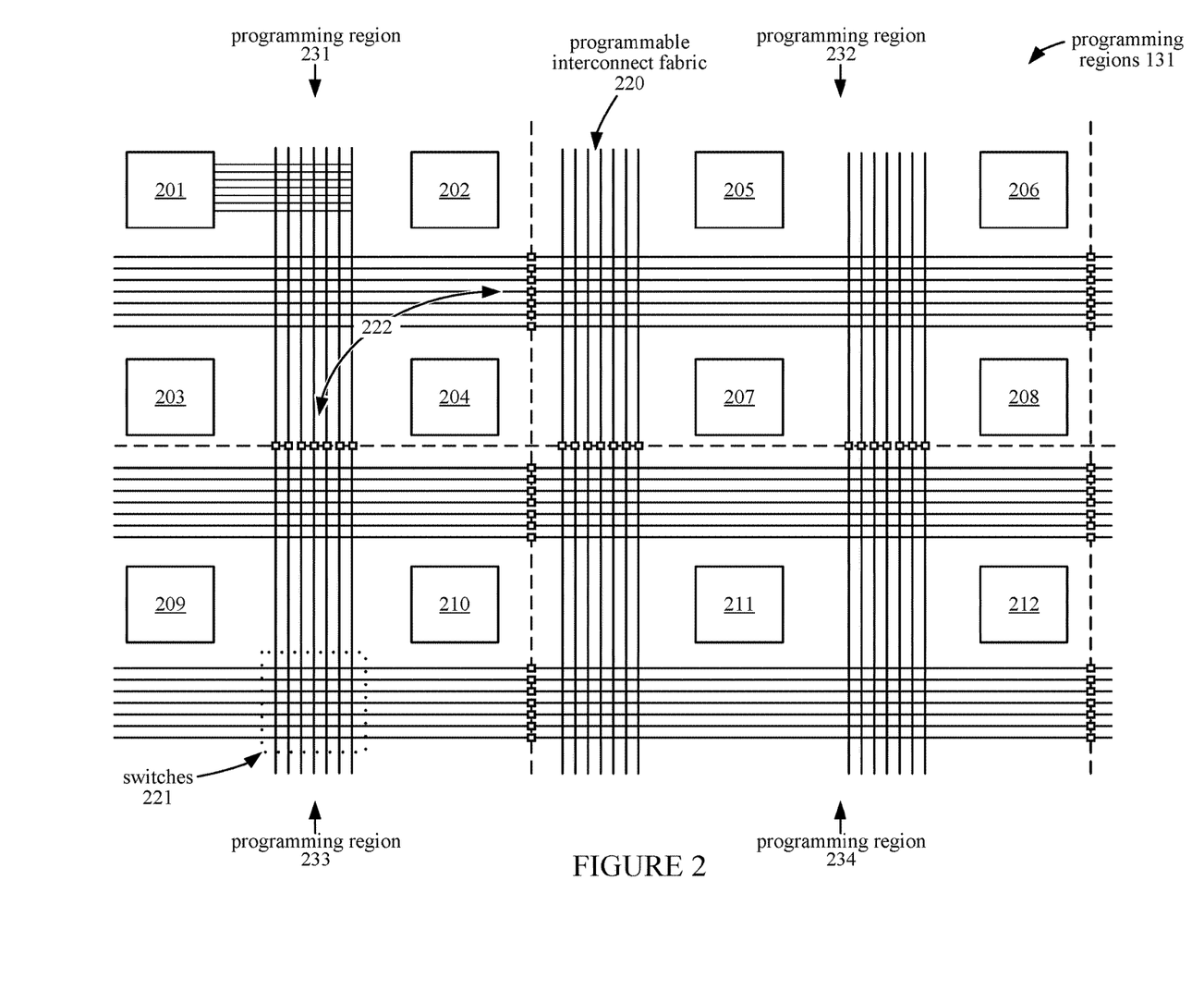
FIG. 2 illustrates programming regions in an FPGA, according to an embodiment.

FIG. 2 illustrates internal components of the programming regions 131 in the FPGA 130, according to an embodiment. The programming regions 131 include an array of configurable logic blocks (i.e., blocks 201-212) and interconnect resources 220-222 used to selectively connect the logic blocks 201-212.

In the FPGA 130, the boundaries of programming regions 131 are indicated by the dashed lines. Programming region 231 includes logic blocks 201-204, programming region 232 includes logic blocks 205-208, programming region 233 includes logic blocks 209 and 210, and programming region 234 includes logic blocks 211 and 212. The programming regions 231-234 divide the programmable logic contained in the FPGA 130 into separate configuration domains, which can be operated and programmed independently of each other, or combined to operate as larger programmable regions. Reconfiguration of the hardware in one programming region can take place while a different programming region is being used to execute one or more instructions.

As illustrated in FIG. 2, the programming regions 231 and 232 each include four configurable logic blocks, while the programming regions 233 and 234 each include two configurable logic blocks. Thus, a given programming region need not have the same number of configurable logic blocks as another programming region in the same programmable device. In alternative embodiments, programming regions may include fewer or more than the illustrated number of configurable logic blocks.

Each of the configurable logic blocks 201-212 includes lookup tables (LUTs) and fixed function blocks. After programming, each combination of function inputs to an LUT results in a predefined output, allowing for the implementation of arbitrary logic functions. Each of the configurable logic blocks can be programmed to perform various functions by writing appropriate values into the LUTs and into configuration memory regions or registers that control the connections between the components (e.g., LUTs, fixed function blocks, etc.) in the logic block.

The configurable logic blocks 201-212 are each connected to a programmable interconnect fabric 220, which includes conductive traces and switches that allow the blocks 201-212 to be selectively connected to each other. In FIG. 2, conductive traces are illustrated connecting the configurable logic 201 to the programmable interconnect fabric 220. The other blocks 202-212 are also connected to the interconnect fabric 220 via conductive traces; however, the conductive traces connecting these blocks 202-212 to the interconnect fabric 220 are omitted from the illustration for the sake of clarity.

The programmable interconnect fabric 220 may in alternative embodiments be less uniform than illustrated in FIG. 2. For example, the interconnect fabric may include conductive traces that have different lengths or may have different numbers of parallel conductive traces in different regions of the FPGA 130. The conductive traces of the interconnect fabric 220 are connected to each other by switches where they intersect. For example, region 221 (indicated by the dotted lines) where multiple traces intersect includes a switch between each intersection between two conductive traces. Alternatively, switches may be present at only some of the intersections in region 221.

The programmable interconnect fabric also includes boundary switches, such as switches 222, that can be used to selectively isolate the components in one programming region from the other programming regions. The boundary switches are located at the boundaries of the programming regions 231-234 in the FPGA 130. For example, the boundary switches 222 are located where the conductive traces of the programmable interconnect fabric 220 cross the boundary of the programming region 231.

Accordingly, the boundary switches 222 can be used to disconnect the configurable logic blocks 201-204 and other components of the programming region 231 from the other programming regions 232-234. Additionally, boundary switches can be selectively closed or opened in order to combine programming regions. For example, the boundary switches 222 that are between programming regions 231 and 232 can be closed to combine regions 231 and 232 with each other while the other boundary switches remain open to isolate the combined programming region 231 and 232 from the other programming regions 233 and 234.

Figure 3:
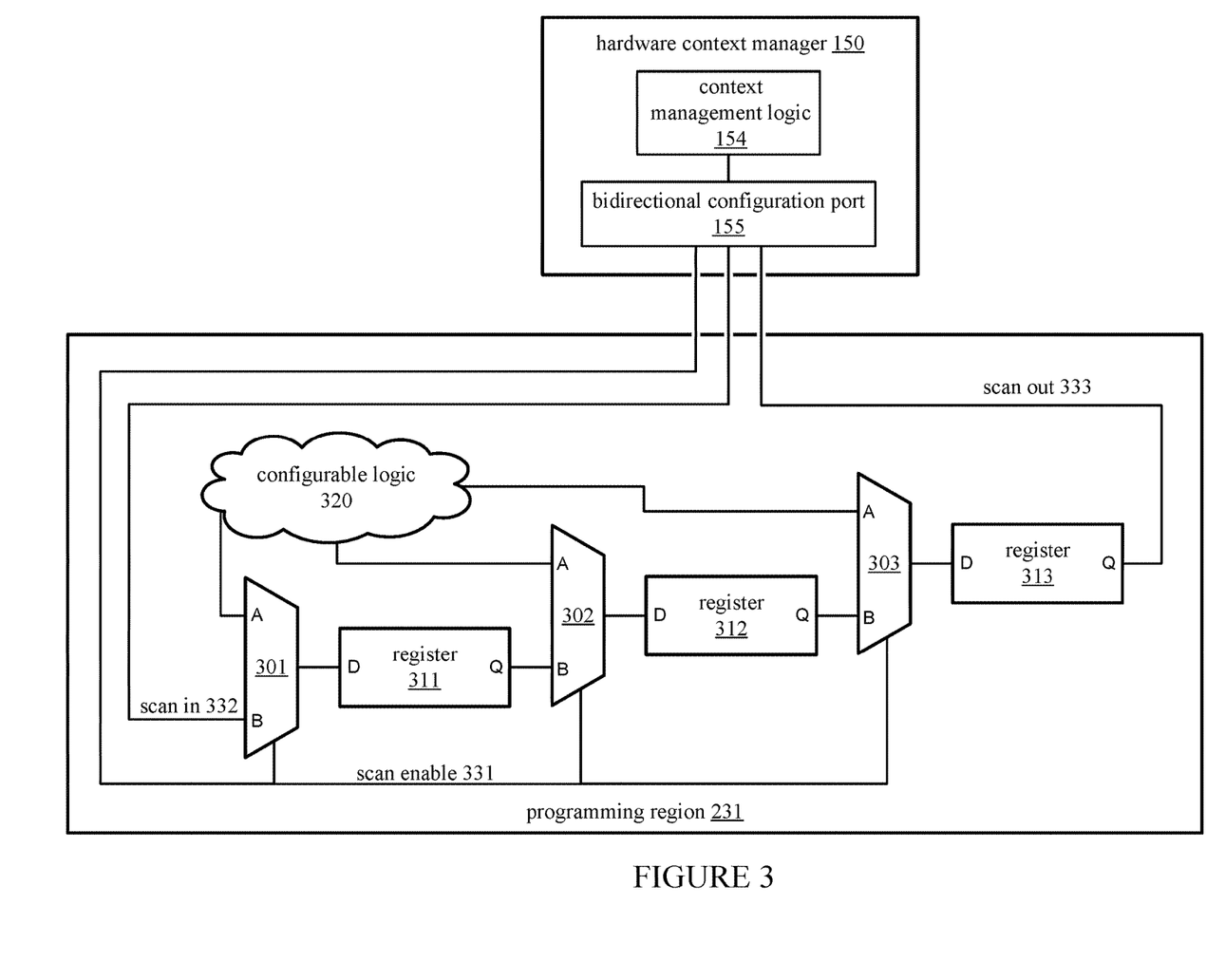
FIG. 3 illustrates a memory in a scan chain configuration in a programming region of an FPGA, according to an embodiment.

FIG. 3 illustrates a scan chain arrangement for connecting registers in the programming region 231, according to an embodiment. A similar scan chain arrangement can be used to connect other memory in the programming region 231 (such as additional registers and BRAM), or to connect memory (e.g., registers or BRAM) in the other programming regions 131. The scan chain configuration facilitates context switching by allowing state information to be shifted in and out of the memory locations (e.g., 311-313) of programming region 231.

The scan chain configuration in the programming region 231 includes multiplexers 301, 302, and 303, where each of the outputs of the multiplexers 301-303 is connected to the D input of registers 311-313, respectively. The output of each register 311-313 is connected to the next sequential multiplexer in the chain; for example, the output 311Q of register 311 is connected to the input 302B of multiplexer 302 and the output 312Q of register 312 is connected to input 303B of multiplexer 303. The scan enable signal 331 is provided by the context management logic 154 via the bidirectional configuration port 155 and, when asserted, connects the B input with the output for each multiplexer 301-303, thus enabling the scan chain and allowing the scan chain to function as a shift register.

The first input 301B in the scan chain is connected to scan in signal 332 from the context management logic 154. State information to be restored to the programming region 231 is provided from the context management logic 154 to the scan chain via scan in signal 332. When the scan chain is enabled, the registers 311-313 can be clocked to serially shift bits of the state information provided via the scan in signal 332 into the registers 311-313.

The last output 313Q of the scan chain is connected to the scan out signal 333, which is received by the context management logic 154 via bidirectional configuration port 155. State information to be saved from the programming region 231 to context memory is provided to the context management logic 154 via the scan out signal 333. When the scan chain is enabled, the registers 311-313 can be clocked to serially shift bits of the state information being saved out of the registers 311-313 and into the context management logic 154, which then stores the state information in context memory.

Clocking the registers 311-313 in the scan chain causes bits to be shifted in from scan in 332 simultaneously with bits being shifted out at scan out 333. Thus, the state information being restored is loaded into the registers 311-313 at the same time the state information being saved is shifted out of the registers 311-313. When the saving and restoring of state information is completed, scan enable signal 331 is deasserted. When the scan enable signal 331 is deasserted, the A inputs of the multiplexers 301-303 are selected so that the registers 311-313 are connected to the configurable logic 320 (e.g., including blocks 201-204) in the programming region 231. In this configuration, the configurable logic 320 has access to the registers 311-313, and execution of the task associated with the restored context can resume in programming region 231. In one embodiment, operation of the scan chain, including enabling and clocking the scan chain, is controlled by a state machine in the context management logic 154 during the context saving and restoring process. In alternative embodiments, the context management logic 154 can save state information from the programming region 231 without simultaneously restoring another state, or may restore a state without simultaneously saving any state information.

Figure 4:
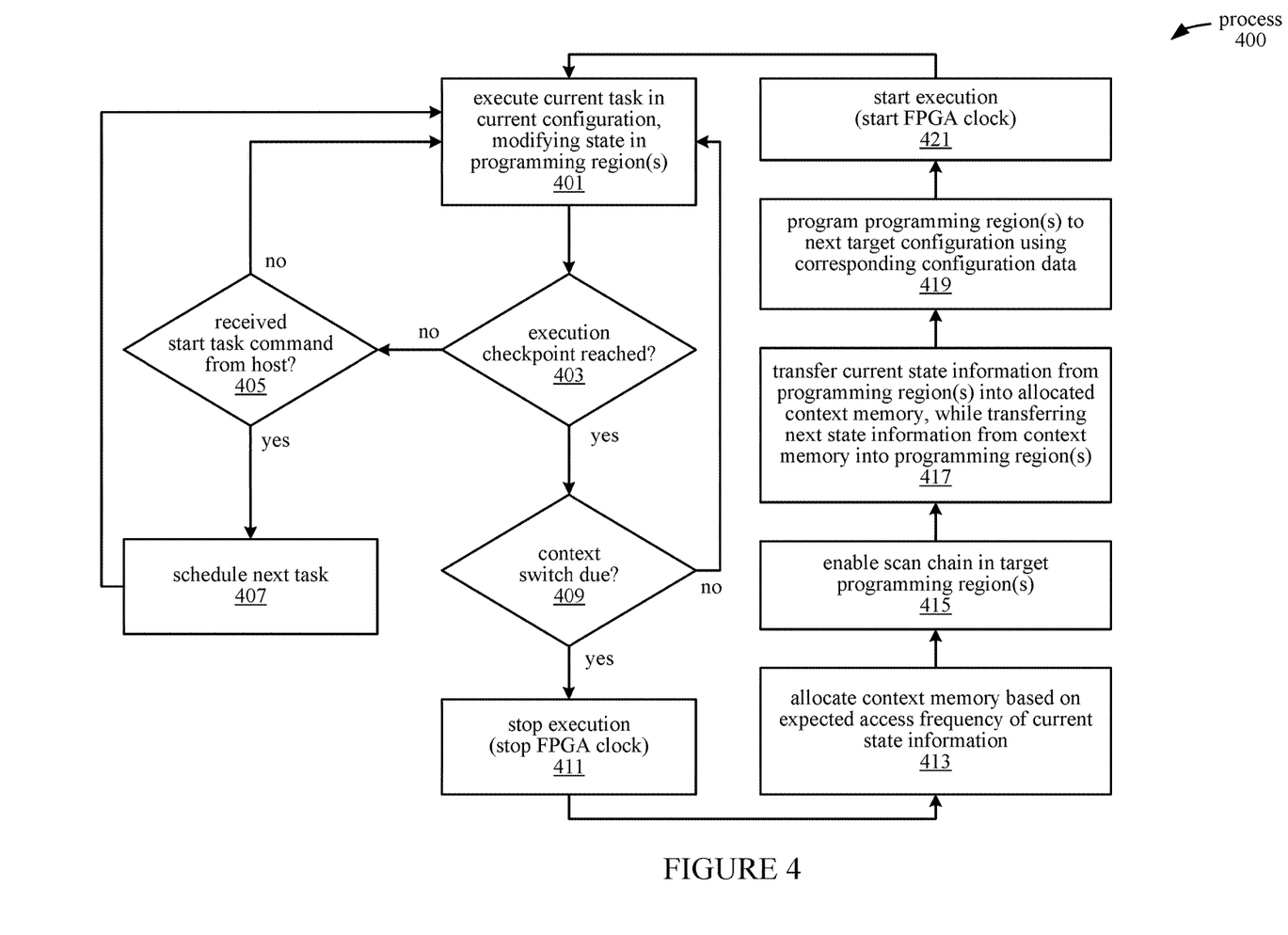
FIG. 4 is a flow diagram illustrating a task execution and context switching process in a computing system, according to an embodiment.

FIG. 4 is a flow diagram illustrating a task execution and context switching process 400, according to an embodiment. The process 400 includes operations performed by components in the computing system 100, such as the hardware context manager 150 and programming regions 131. As illustrated in FIG. 4, blocks 401-409 represent operations performed while a task is being executed in one or more configured programming regions 131, while blocks 411-421 represent operations performed for effecting a context switch.

The process 400 begins at block 401. At block 401, a current task is executed in a current configuration of the programming regions 131. Execution of the current task may have been previously initiated by a prior iteration of the process 400. The execution of the task in the programming regions 131 modifies values stored in the memory (e.g., registers and BRAM) of the programming regions 131. Thus, state information for the task is being generated at this stage based on the configuration of the programming regions 131 and based on input data being processed by the task. As an example, a task A executed using a configuration A of the programming regions 131 generates state information associated with a context A. In an alternative embodiment, if the programming region 131 is not yet configured and is not executing any task, the hardware context manager 150 merely waits for input at block 401. From block 401, the process 400 continues at block 403.

At block 403, the scheduling logic 152 in the hardware context manager 150 determines whether an execution checkpoint has been reached for the current task (e.g., task A). At block 403, if a checkpoint has not been reached, the process 400 continues at block 405.

At block 405, if a 'Start Task' command has not been received from the host 110 at the command interface 151, the process 400 continues back to block 401. Thus, the process 400 repeats blocks 401-405 in a loop while a checkpoint has not been reached and no commands have been received from the host 110.

At block 405, if a 'Start Task' command has been received from the host 110 at the command interface 151, then the process 400 continues at block 407. Continuing the previous example, while task A is being executed in configuration A of the programming regions 131, the host 110 issues a 'Start Task' command to request execution of a new task B, which further entails reconfiguration of the programming regions 131 to a new target configuration B to support the execution of task B. The 'Start Task' command is received at the command interface 151. From block 405, the process 400 continues at block 407.

At block 407, the scheduling logic 152 schedules the new task in response to the 'Start Task' command received at block 405. Continuing the previous example, the scheduling logic 152 schedules the reconfiguration of programming regions 131 to the new target configuration B and the execution of task B in the target configuration B. The scheduling logic 152 thus controls the timing of the context switch that is performed in connection with this reconfiguration. In one embodiment, the scheduling logic 152 accounts for task priority and optimization goals when scheduling the reconfiguration, context switching, and task execution operations. From block 407, the process 400 returns to block 401 where execution of the current task (e.g., task A) continues. At this point, the requested switch to the next context (e.g., context B) is scheduled to take place when task A reaches its next checkpoint. The process 400 thus performs the operations of blocks 401-407 whenever a new task has been requested by the host 110 and a checkpoint has not yet been reached.

From block 401, the process 400 continues at block 403, which evaluates whether a checkpoint has been reached for the current task (e.g., task A). In one embodiment, a checkpoint is indicated when all dependencies on internal register states used by the task have been cleared. Alternatively, a checkpoint may be indicated when a local minimum number of registers or memory locations are being used by the task. At block 403, if an execution checkpoint for the current task has been reached, the process 400 continues at block 409.

At block 409, in response to reaching the checkpoint, the scheduling logic 152 determines whether a context switch is due. A context switch may be due as a result of previously being scheduled by the scheduling logic 152 in response to a command such as a 'Start Task', 'Save Context', or 'Restore Context' command. If a context switch is not due (i.e., no context switch is pending), then the process 400 returns to block 401. The process 400 may thus repeat blocks 401-409 such that execution of the current task continues past any checkpoints reached until a context switch is due. If a checkpoint is reached when a context switch is due (e.g., the scheduled switch to context B resulting from the 'Start Task' command to execute task B), then from block 409, the process 400 continues at block 411.

The operations of blocks 411-421 are performed to effect the context switch from the current context (e.g., context A) to the next context (e.g., context B). The context switch includes saving state information for the current task (e.g., task A) and reconfiguring the programming regions 131 to a new target configuration (e.g., configuration B) for executing a new task (e.g., task B). Since the next task (e.g., task B) has not yet been run, it has not yet generated any state information that needs to be restored to the programming regions 131 as part of the context switch. The scheduling logic 152 controls the timing of context switches; therefore, the scheduling logic 152 invokes the context management logic 154 to perform the context switch when the context switch is due, as scheduled.

At block 411, the context management logic 154 stops the execution of the current task in the programming regions 131 by stopping the clock signal supplied to the programming regions 131. At the next block 413, the allocation logic 156 allocates context memory for storing the context for the current task. The context memory is allocated from one of multiple possible locations (e.g., context memory in BRAM 161, DRAM 162, or external context memory 163) depending on the expected access frequency, size, or other characteristics of the context. For example, the allocation logic 156 may allocate context memory in BRAM 161 to store context A corresponding to the current task A upon determining that task A is a high priority task and that context A will therefore be accessed relatively frequently. From block 413, the process 400 continues at block 415.

At block 415, the context management logic 154 begins the process for transferring the state information generated by the current task (e.g., task A) from the programming regions 131 to the allocated context memory by enabling the scan chain connecting the registers and other memory in the one or more programming regions 131 targeted for the context switch and reconfiguration. The context management logic 154 enables the scan chain by asserting the scan enable signal 331, illustrated in FIG. 3. From block 415, the process 400 continues at block 417.

At block 417, the context management logic 154 transfers the current state information from the programming regions 131 into the allocated context memory while transferring any next state information from context memory into the programming regions 131 via the enabled scan chain. Continuing the previous example, the context management logic 154 transfers the state information generated by task A from the programming regions 131 into the context memory 161 that was previously allocated to store context A. The state information is shifted out from the output 333 of the scan chain structure and received by the context management logic 154 via bidirectional configuration port 155. The context management logic 154 then stores the state information in the allocated context memory 161 for context A.

Since the next task B has not yet generated any state information, state information for task B is not transferred from context memory to the programming regions 131 at this time. However, an initial state for task B may be shifted into the memory in the scan chain to provide initial values for executing task B simultaneously with shifting out the state information for context A. From block 417, the process 400 continues at block 419.

At block 419, the configuration logic 153 programs the targeted programming regions 131 to implement the next target configuration using corresponding configuration data (e.g., a configuration bitstream). In one embodiment, the reprogramming of the programming regions 131 by the configuration logic 153 is initiated by the scheduling logic 152; alternatively, the reprogramming may be triggered by the context management logic 154 when the saving of the state information in block 417 has been completed. Continuing the previous example, the configuration logic 153 overwrites the current configuration A in the programming regions 131 with the new target configuration B to prepare the programming regions 131 to execute task B. From block 419, the process 400 continues at block 421.

At block 421, once the programming regions 131 are configured to the next target configuration (e.g., configuration B) and any initial state information is loaded into the memory of the programming regions 131, the context management logic 154 starts execution of the next task (e.g., task B); this task becomes the current task. In one embodiment, the context management logic 154 starts execution by restarting the clock signal supplied to the programming regions 131. From block 421, the process 400 continues back to block 401. At block 401, the new current task is executed in the new current configuration (e.g., task B is executed in configuration B), and modifies the register and memory state in the programming regions 131.

In a subsequent iteration of the task execution and context switching process 400, the context previously stored in context memory is restored to the programming regions 131. Continuing the previous example, the context A that was previously saved in context memory 161 is restored so that task A can be resumed using configuration A of programming regions 131. The restoration of context A is initiated according the operation of blocks 401-409; in these blocks, the scheduling logic 152 controls the timing for restoring context A. In one embodiment, the scheduling logic 152 determines the time for restoring context A based the sequence of tasks assigned for execution in the programming regions 131. For example, the scheduling logic 152 may start restoring context A when task B has completed and there are no higher priority tasks than task A awaiting execution. The scheduling logic 152 may also start restoring context A in response to the command interface 151 receiving a command requesting the restoration of context A and the reprogramming of the programming regions 131 to configuration A when the next checkpoint has been reached.

The restoration of context A proceeds according to blocks 411-421. At block 411, the context management logic 154 stops executing the current task (e.g., task B) by stopping the clock signal supplied to the programming regions 131 in which the current task is being executed. At the next block 413, the allocation logic 156 allocates context memory for context B.

At block 415, the context management logic 154 enables the scan chain in the programming regions 131, then at block 417 restores context A while simultaneously saving context B in the scan chain connected memory. In particular, the scan chain is clocked so that bits of the state information A retrieved from context memory are sequentially shifted into the scan chain via the scan in input 332 while bits of the state information B are simultaneously shifted out at the scan out output 333 and stored in the context memory allocated for context B.

At block 419, the configuration logic 153 reprograms the targeted programming regions 131 to implement configuration A using the configuration data for configuration A. As a result, the bitstream for configuration B in the programming regions 131 is overwritten by the bitstream for configuration A, and the programming regions 131 are thus reconfigured to configuration A. Once the programming regions 131 have been reconfigured, the execution of task A in the programming regions 131 is started at block 421 by restarting the clock signal supplied to the programming regions 131.

By the operation of process 400 as performed by the components of FPGA 130, such as the hardware context manager 150 and programming regions 131, the FPGA 130 is able to support context switching for tasks that are executed using different configurations of the programming regions 131 with or without intervention by the host device 110. The FPGA 130 efficiently saves and restores memory state in the programming regions 131 by utilizing a scan chain topology to connect memory in the programming regions 131. Additional optimization can be achieved by appropriately directing the placement of context data in different types of context memory (e.g., BRAM, DRAM, or external memory) and by allowing execution of a task to proceed to a checkpoint before saving its context. The FPGA 130 with context switching capabilities can be used to support multi-threaded workloads and sharing of its resources among multiple virtual machines via time multiplexing.

A hardware context manager 150 in the FPGA 130 includes configuration logic 153 that is configured to program one or more programming regions 131 in the FPGA device 130 based on configuration data for implementing a target configuration of the one or more programming regions 131. Context management logic 154 is coupled with the configuration logic 153 and is configured to save a first context corresponding to the target configuration by retrieving first state information from the set of one or more programming regions 131, where the first state information is generated based on the target configuration, and storing the retrieved first state information in a context memory. The context management logic 154 is also configured to restore the first context by transferring the first state information from the context memory to the one or more programming regions 131, and causing the configuration logic 153 to program the one or more programming regions 131 based on the configuration data.

In the hardware context manager 150, the context memory comprises block random access memory (BRAM) 161 in the FPGA device, dynamic random access memory (DRAM) 162 located on a carrier card of the FPGA device, and memory 163 external to the carrier card. The context management logic 154 includes allocation logic 156 that is configured to allocate context memory for the first state information based on an expected access frequency of the first state information.

Memory in the one or more programming regions 131 is connected in a scan chain, and the context management logic 154 is configured to restore the first context simultaneously with saving a second context by shifting the first state information into the scan chain while shifting second state information for the second context out of the scan chain.

In the hardware context manager 150, the configuration logic 153 and the context management logic 154 are located on the same FPGA die 130 as the one or more programming regions 131.

The hardware context manager 150 also includes scheduling logic 152 coupled with the configuration logic 153 and the context management logic 154. The scheduling logic 152 is configured to control the timing of saving the first context and restoring the first context by the context management logic 154 based on a sequence of tasks to be executed in the one or more programming regions 131.

In the hardware context manager 150, the scheduling logic 152 is configured to cause the context management logic 154 to save the first context in response to determining that execution of a task in the one or more programming regions 131 has reached a checkpoint.

The hardware context manager 150 also includes a bidirectional configuration port 155 coupled with the configuration logic 153 and coupled with the context management logic 154. The bidirectional configuration port 155 is configured to transmit the configuration data and the first state information to the one or more programming regions 131, and receive the first state information from the one or more programming regions 131.

A method of performing a context switch in an FPGA device 130 includes programming one or more programming regions 131 in the FPGA device 130 based on configuration data for implementing a target configuration of the one or more programming regions 131, saving a first context corresponding to the target configuration by transferring first state information from the set of one or more programming regions 131 to a context memory 161-163, and restoring the first context. The first state information is generated based on the target configuration, and restoring the first context includes transferring the first state information from the context memory to the one or more programming regions 131, and reprogramming the one or more programming regions 131 based on the configuration data.

In the method, the reprogramming of the one or more programming regions 131 and the transferring of the first state information from the context memory to the one or more programming regions 131 are performed in response to a command requesting the restoring of the first context, and the reprogramming is performed prior to executing a task in the one or more programming regions 131.

In the method, memory in the one or more programming regions 131 is connected in a scan chain, and the transferring the first state information from the context memory 161-163 to the one or more programming regions 131 includes enabling the scan chain, and shifting the first state information into the scan chain while simultaneously shifting second state information out of the scan chain.

The method also includes, in response to receiving from a host device 110 a request to execute a task in the target configuration of the one or more programming regions 131, scheduling the programming, and controlling the timing of the saving of the first context and the restoring of the first context based on a sequence of tasks assigned for execution in the one or more programming regions 131.

In the method, the context memory includes one or more of block random access memory (BRAM) 161 in the FPGA device 130, dynamic random access memory (DRAM) 162 located outside the FPGA device 130 and on a carrier card 120 of the FPGA device 130, and memory 163 external to the carrier card. The method also includes allocating context memory 161-163 for the first state information based on an expected access frequency of the first state information.

In the method, the saving of the first context is performed in response to determining that execution of a task in the one or more programming regions 131 has reached a checkpoint.

A computing system 100 includes one or more programming regions 131 in a FPGA device 130, a context memory 161-163, and a hardware context manager 150. The hardware context manager 150 includes configuration logic 153 configured to program the one or more programming regions 131 based on configuration data for implementing a target configuration of the one or more programming regions 131 and context management logic 154 coupled with the configuration logic 153. The context management logic 154 is configured to save a first context corresponding to the target configuration by retrieving state information from the set of one or more programming regions 131, where the state information is generated based on the target configuration, and storing the retrieved state information in the context memory 161-163. The context management logic 154 is configured to restore the first context by transferring the state information from the context memory 161-163 to the one or more programming regions 131, and causing the configuration logic 153 to program the one or more programming regions 131 based on the configuration data.

In computing system 100, the hardware context manager 150 includes dedicated logic circuitry on the same die 130 as the one or more programming regions 131.

In computing system 100, the hardware context manager 150 is implemented in one or more configurable logic blocks 201-212 of the one or more programming regions 131, and the context memory 161-163 includes block random access memory (BRAM) in the one or more programming regions 131.

Computing system 100 also includes a host device 110 coupled with the hardware context manager 150 via a communication port 132. The host device 110 is configured to request execution of a task in the target configuration of the one or more programming regions 131, and the context management logic 154 is configured to associate the task with the first context using a context identifier.

In computing system 100, the hardware context manager 150 also includes a command interface 151 configured to, in response to one or more commands received from a host device 110, cause the context management logic 154 to save the first context, cause the context management logic 154 to restore the first context, and schedule a task to be executed in the one or more programming regions 131 using the target configuration.

In computing system 100, the hardware context manager 150 also includes a bidirectional configuration port 155 coupled with the configuration logic 153 and coupled with the context management logic. The bidirectional configuration port is configured to transmit the configuration data and the state information to the one or more programming regions 131 and receive the state information from the one or more programming regions 131.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A hardware context manager in a field programmable gate array (FPGA) device, comprising:
    configuration logic configured to program one or more programming regions in the FPGA device based on configuration data for implementing a target configuration of the one or more programming regions;
    context management logic coupled with the configuration logic, wherein the context management logic is configured to:
        save a first context corresponding to the target configuration by:
            retrieving first state information from the set of one or more programming regions, wherein the first state information is generated based on the target configuration, and storing the retrieved first state information in a context memory, and
        restore the first context by:
            transferring the first state information from the context memory to the one or more programming regions, and
            causing the configuration logic to program the one or more programming regions based on the configuration data; and
    scheduling logic coupled with the configuration logic and the context management logic, wherein the scheduling logic is configured to control timing of saving the first context based on a sequence of tasks to be executed in the one or more programming regions.

2. The hardware context manager of claim 1, wherein the context memory comprises block random access memory (BRAM) in the FPGA device, dynamic random access memory (DRAM) located on a carrier card of the FPGA device, and memory external to the carrier card.

3. The hardware context manager of claim 1, wherein the context management logic comprises allocation logic configured to allocate context memory for the first state information based on an expected access frequency of the first state information.

4. The hardware context manager of claim 1, wherein memory in the one or more programming regions is connected in a scan chain, and wherein the context management logic is configured to restore the first context simultaneously with saving a second context by shifting the first state information into the scan chain while shifting second state information for the second context out of the scan chain.

5. The hardware context manager of claim 1, wherein the configuration logic and the context management logic are located on the same FPGA die as the one or more programming regions.

6. The hardware context manager of claim 1, wherein the scheduling logic is configured to control timing of restoring the first context by the context management logic based on the sequence of tasks to be executed in the one or more programming regions.

7. The hardware context manager of claim 6, wherein the scheduling logic is configured to cause the context management logic to save the first context in response to determining that execution of a task in the one or more programming regions has reached a checkpoint.

8. The hardware context manager of claim 1, further comprising:
    a bidirectional configuration port coupled with the configuration logic and coupled with the context management logic, wherein the bidirectional configuration port is configured to:
        transmit the configuration data and the first state information to the one or more programming regions, and
        receive the first state information from the one or more programming regions.

9. A method, comprising:
    programming one or more programming regions in a field programmable gate array (FPGA) device based on configuration data for implementing a target configuration of the one or more programming regions;
    saving a first context corresponding to the target configuration by transferring first state information from the set of one or more programming regions to a context memory, wherein the first state information is generated based on the target configuration; and
    restoring the first context by:
        transferring the first state information from the context memory to the one or more programming regions, and
        reprogramming the one or more programming regions based on the configuration data; and
    in the FPGA device, controlling timing of saving the first context based on a sequence of tasks to be executed in the one or more programming regions.

10. The method of claim 9, wherein the reprogramming of the one or more programming regions and the transferring of the first state information from the context memory to the one or more programming regions are performed in response to a command requesting the restoring of the first context, and wherein the reprogramming is performed prior to executing a task in the one or more programming regions.

11. The method of claim 9, wherein memory in the one or more programming regions is connected in a scan chain, and wherein the transferring the first state information from the context memory to the one or more programming regions comprises:
    enabling the scan chain, and
    shifting the first state information into the scan chain while simultaneously shifting second state information out of the scan chain.

12. The method of claim 9, further comprising:
in response to receiving from a host device a request to execute a task in the target configuration of the one or more programming regions, scheduling the programming; and
controlling the timing of the saving of the first context and the restoring of the first context based on a sequence of tasks assigned for execution in the one or more programming regions.

13. The method of claim 9, wherein the context memory comprises one or more of block random access memory (BRAM) in the FPGA device, dynamic random access memory (DRAM) located outside the FPGA device and on a carrier card of the FPGA device, and memory external to the carrier card, wherein the method further comprises allocating context memory for the first state information based on an expected access frequency of the first state information.

14. The method of claim 9, wherein the saving of the first context is performed in response to determining that execution of a task in the one or more programming regions has reached a checkpoint.

15. A computing system, comprising:
one or more programming regions in a field programmable gate array (FPGA) device;
a context memory;
a hardware context manager in the FPGA device, comprising:
configuration logic configured to program the one or more programming regions based on configuration data for implementing a target configuration of the one or more programming regions; and
context management logic coupled with the configuration logic, wherein the context management logic is configured to:
save a first context corresponding to the target configuration by:
retrieving state information from the set of one or more programming regions, wherein the state information is generated based on the target configuration, and
storing the retrieved state information in the context memory, and
restore the first context by:
transferring the state information from the context memory to the one or more programming regions, and
causing the configuration logic to program the one or more programming regions based on the configuration data; and
scheduling logic coupled with the configuration logic and the context management logic, wherein the scheduling logic is configured to control timing of saving the first context based on a sequence of tasks to be executed in the one or more programming regions.

16. The computing system of claim 15, wherein the hardware context manager comprises dedicated logic circuitry on the same die as the one or more programming regions.

17. The computing system of claim 15, wherein the hardware context manager is implemented in one or more configurable logic blocks of the one or more programming regions, and wherein the context memory comprises block random access memory (BRAM) in the one or more programming regions.

18. The computing system of claim 15, further comprising a host device coupled with the hardware context manager via a communication port, wherein the host device is configured to request execution of a task in the target configuration of the one or more programming regions, and wherein the context management logic is configured to associate the task with the first context using a context identifier.

19. The computing system of claim 15, wherein the hardware context manager further comprises a command interface configured to, in response to one or more commands received from a host device:
cause the context management logic to save the first context;
cause the context management logic to restore the first context; and
schedule a task to be executed in the one or more programming regions using the target configuration.

20. The computing system of claim 15, wherein the hardware context manager further comprises:
a bidirectional configuration port coupled with the configuration logic and coupled with the context management logic, wherein the bidirectional configuration port is configured to:
transmit the configuration data and the state information to the one or more programming regions, and
receive the state information from the one or more programming regions.

* * * * *